(12) United States Patent
Chorian et al.

(10) Patent No.: US 9,196,930 B2
(45) Date of Patent: Nov. 24, 2015

(54) VEHICLE BATTERY CELL WITH INTEGRAL CONTROL CIRCUIT

(75) Inventors: Steven F. Chorian, Canton, MI (US); Jeffrey William Miller, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1181 days.

(21) Appl. No.: 13/071,478

(22) Filed: Mar. 24, 2011

(65) Prior Publication Data

US 2012/0242144 A1 Sep. 27, 2012

(51) Int. Cl.
| | |
|---|---|
| *H02J 7/00* | (2006.01) |
| *B60L 1/00* | (2006.01) |
| *H02H 7/18* | (2006.01) |
| *H01M 10/42* | (2006.01) |
| *H01M 2/34* | (2006.01) |
| *H01M 10/48* | (2006.01) |
| *B60L 11/18* | (2006.01) |

(52) U.S. Cl.
CPC ......... *H01M 10/425* (2013.01); *B60L 11/1861* (2013.01); *B60L 11/1879* (2013.01); *H01M 2/34* (2013.01); *H01M 2/348* (2013.01); *H01M 10/4207* (2013.01); *H01M 10/482* (2013.01); *H01M 10/486* (2013.01); *B60L 2240/545* (2013.01); *H01M 10/4264* (2013.01); *H01M 2010/4271* (2013.01); *H01M 2010/4278* (2013.01); *H01M 2200/103* (2013.01); *H01M 2220/20* (2013.01); *Y02T 10/705* (2013.01); *Y02T 10/7005* (2013.01); *Y02T 10/7044* (2013.01); *Y02T 90/16* (2013.01); *Y10T 29/49002* (2015.01)

(58) Field of Classification Search
CPC .................................................. H01M 10/425
USPC ......... 320/104, 112, 122, 120; 307/10.1, 10.7
See application file for complete search history.

(56) References Cited

U.S. PATENT DOCUMENTS

| | | | |
|---|---|---|---|
| 6,599,655 B2 * | 7/2003 | Johnson et al. ................. | 429/50 |
| 7,471,066 B2 * | 12/2008 | Ambrosio et al. ............ | 320/119 |
| 7,609,031 B2 | 10/2009 | Benekenstein | |
| 7,615,966 B2 * | 11/2009 | Houldsworth et al. ....... | 320/132 |
| 7,772,799 B2 * | 8/2010 | Wu ................. | 320/104 |
| 8,242,745 B2 * | 8/2012 | Zhang et al. ................. | 320/119 |
| 8,426,047 B2 * | 4/2013 | Emori et al. .................... | 429/61 |
| 8,786,261 B2 * | 7/2014 | Andrea ......................... | 320/152 |
| 8,933,721 B2 * | 1/2015 | Deboy ..................... | 324/761.01 |
| 2010/0052615 A1 | 3/2010 | Loncarevie | |

* cited by examiner

*Primary Examiner* — Richard V Muralidar
(74) *Attorney, Agent, or Firm* — Carlson, Gaskey & Olds, P.C.

(57) ABSTRACT

The present disclosure relates to a vehicle battery pack having battery cells with an integral control circuit configured to communicate with a battery energy control module.

21 Claims, 4 Drawing Sheets

VEHICLE BATTERY CELL WITH INTEGRAL CONTROL CIRCUIT

TECHNICAL FIELD

The present disclosure relates to vehicle battery packs and battery cell management.

BACKGROUND

Typical hybrid electric vehicle battery packs consist of many individual battery cells—for example, some PHEV battery packs may have in excess of 150 individual lithium-ion cells within the pack. The cells are governed by a central control module or battery energy control module. Consequently, the battery pack must have a corresponding number of sense wires running between each cell and the battery energy control module. One example of a battery management system for controlling a plurality of battery cells is shown and discussed in U.S. Patent Publication No. 2010/0052615 titled "Battery Management System." The disclosed battery management system includes a controller configured to control a plurality of battery cells. The controller is remotely positioned with respect to each battery cell and is configured to measure voltage across the battery terminals. This configuration creates a great deal of complexity in the battery pack which can adversely affect manufacturability.

Therefore, it is desirable to have a vehicle battery cell with an integral control circuit configured to control, monitor and send communications regarding individual cell performance. It is also desirable to have a vehicle battery pack that will streamline communication lines between a battery cell and the battery energy control module.

SUMMARY

The present invention may address one or more of the above-mentioned issues. Other features and/or advantages may become apparent from the description that follows.

Certain embodiments of the present invention relate to a vehicle battery pack, including: a battery cell having an integral control circuit configured to communicate with a battery energy control module.

Another exemplary embodiment of the present invention relates to a control circuit attachable to a battery cell for a vehicle battery pack configured to detect a predetermined condition and connect or disconnect the battery cell when the predetermined condition is met.

Another exemplary embodiment of the present invention relates to a method of managing the state of charge in a plurality of battery cells, the method including: communicating with an integral battery cell control circuit; and sending performance commands for the battery cell based on data received from the integral battery cell control circuit.

Another exemplary embodiment of the present invention relates to a method of manufacturing a vehicle battery pack, the method including: connecting a current interruption device between the battery cells; and connecting a cell to a designated integral control circuit configured to control the current interruption device according to predetermined conditions.

Another exemplary embodiment of the present invention relates to a vehicle battery cell, including: an integral control circuit configured to communicate with a battery energy control module for a plurality of cells.

One benefit provided with the present teachings is that they enable the use of a single wire to communicate all of a battery cell's parametric data to the battery energy control module. This feature enables communication between the battery cells and the control module regardless of the number of individual cells within a battery pack. This configuration also enhances system robustness against electromagnetic interference.

Another benefit to the present teachings is that they eliminate the need for individual sense wires running from each cell to the battery energy control module thus resulting in reduced cost, improved manufacturability, and reduced battery energy control module circuit complexity.

Another benefit to the present teachings is that they enable the battery energy control module circuit to be digital thereby allowing the battery energy control module to be located remotely from the cells. The system enables up-integration of the battery energy control module functions into other vehicle control electronics (e.g., the powertrain control module or vehicle control module) for cost and weight savings as well.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

Figure 1:
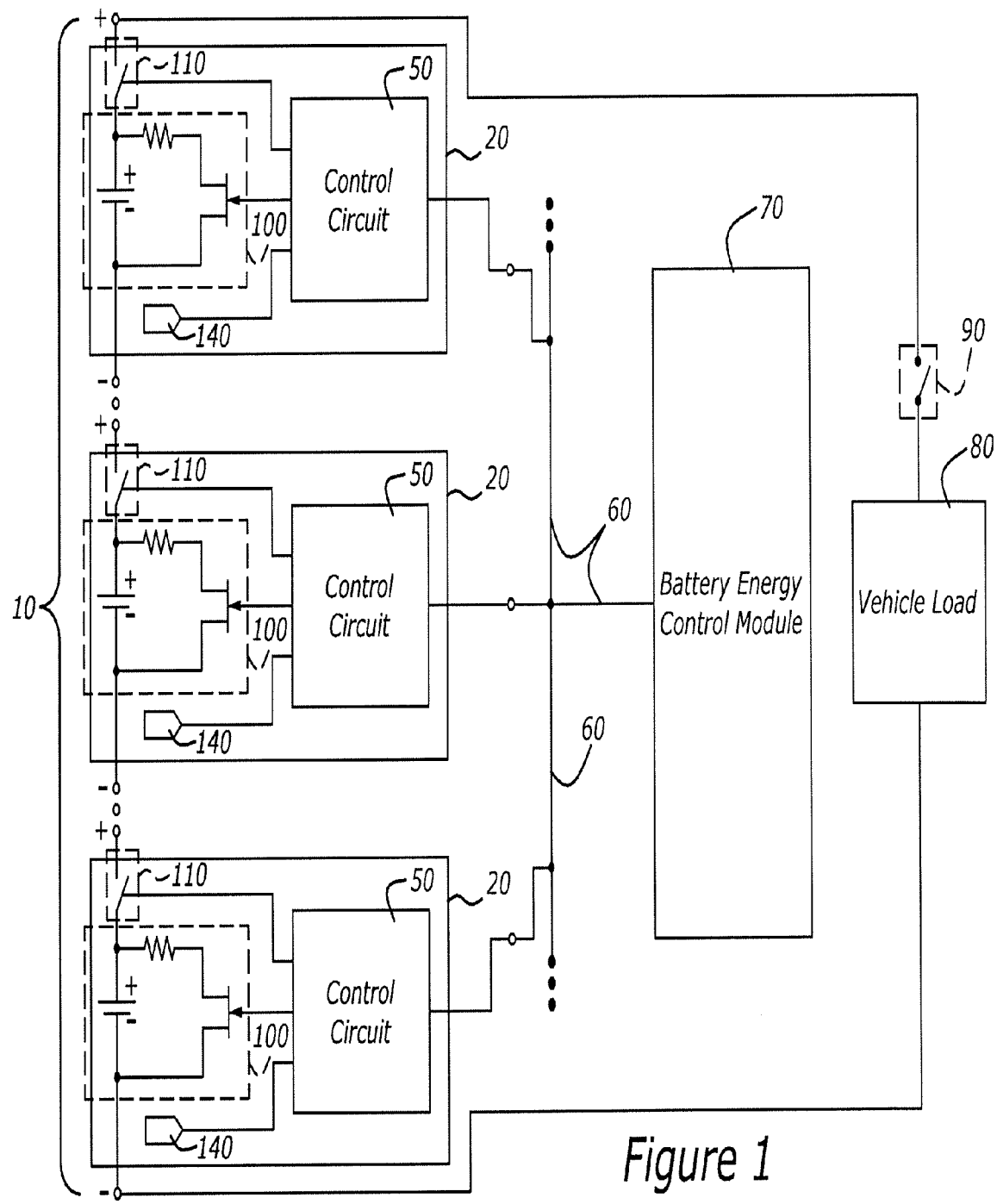
FIG. 1 illustrates a system configuration for a battery pack having several vehicle batteries in series.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, wherein like characters represent the same or corresponding parts throughout the several views, there are shown exemplary vehicle battery cells having integral control circuits configured to monitor and measure individual cell performance. In the illustrated embodiments, the control circuits are directly mounted to the battery cells. Accordingly, analog data transmission is not required across the entire battery pack and the vehicle. The control circuits are configured to receive both analog and digital signals and transmit digital communications to the battery energy control module (or BECM).

Disclosed embodiments are battery cells incorporating a dedicated electronic control circuit that is mounted on or within the cell's structure. This control circuit consists of a logic circuit or microprocessor that monitors the cell's state of charge, temperature, and other characteristics and then controls the charge or discharge of the cell in accordance with commands from the BECM. The circuits have the ability to interrupt electrical current from the cell in the event that a predetermined condition occurs. Cell parameters and commands are communicated between the circuit and the BECM digitally, via a serial data bus wire transceiver circuit (utilizing e.g., a protocol such as SAE-J2411).

Referring now to FIG. 1, there is shown a vehicle battery pack 10 having a plurality of battery cells 20 arranged within a battery case. The vehicle battery pack 10 can be configured to power a motor vehicle (e.g., a hybrid electric or all electric vehicle). The battery pack case houses a series of individual battery cells 20. In this embodiment, the pack 10 includes 150 cells. In other embodiments, the pack 10 can include more or fewer cells than 150 cells. Battery cells 20 are lithium-ion. In other embodiments, the battery cells can be nickel-based, e.g., NiMH, cadmium, alkaline, lead acid, fuel cells or any other type of battery cell.

Each cell 20, as shown in FIG. 1, includes a dedicated control circuit 50 integrated into the structure of the cell. In the illustrated embodiment, control circuits 50 are attached to a cell housing. Control circuits 50 are connected to a common data line 60. A communication line extends from each integral control circuit to the single serial data line 60. The data line 60 is connected to a BECM 70 (or battery energy control module). Data line 60 is a two-way communication line. Information is both sent from and received by the integral control circuit 50.

Figure 2:
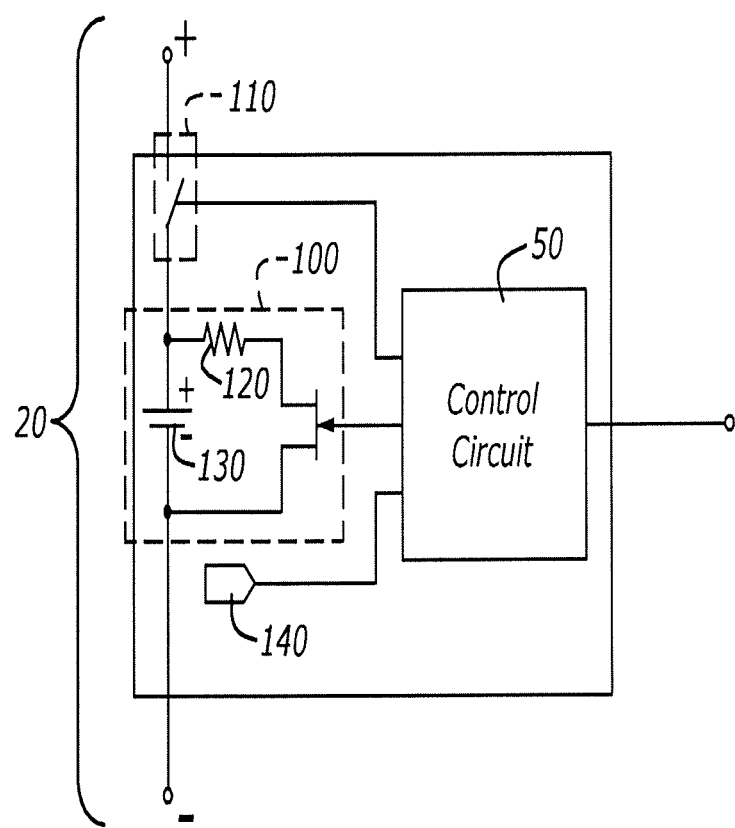
FIG. 2 is a vehicle battery cell with integral control circuit.

The battery pack 10, as shown in FIG. 1, includes cells 20 arranged in series. Three exemplary battery cells are schematically shown. Each cell 20 is connected to a BECM 70 through the single serial data line 60. The BECM 70 includes a processor (not shown) configured with logic to accept performance data related to each cell and send commands to disconnect a cell when necessary. Additional cells (not shown) are connected to the BECM 70. The battery pack 10 supplies power to other vehicle powertrain components (e.g., an electric motor or drive unit). The powertrain requires or demands a certain load 80 or voltage from the battery pack, as shown in FIG. 2. The load 80 can vary depending on vehicle performance demands. The vehicle load 80 can also be a power source to the battery pack 10, e.g., based on power received from an engine or braking. BECM 70 is connected to the vehicle load 80. BECM 70 controls the power output of the battery cells 20 based on vehicle performance needs and/or cell activity. When needed a service switch 90, included with the battery pack 10, is utilized to disconnect the battery pack from the vehicle load 80. Service switch 90 can be, for example, any circuit breaker, relay, transistor or fuse.

Each battery cell 20 shown in FIG. 2 includes its own individualized control circuit 50. The control circuit 50 is integrated into the battery cell structure (e.g., as shown in FIG. 1). Control circuit 50, of FIG. 2, includes battery management logic configured to selectively utilize a cell balancing circuit 100 to drain the battery when a predetermined state of charge is detected. In one embodiment, the control circuit 50 is configured to manage the state of charge of the battery cell to within a range of 10%-90% of capacity. Each cell 20 also has a current interruption device (or CID) 110 to disconnect the cell 20 from the other cells and connect the cell to the cell balancing circuit 100. Each cell having a dedicated CID 110 eliminates the need for external system relays because the control for connection to vehicle load is contained within each cell—resulting in reduced cost and reduced system complexity. The CID 110 is positioned between the positive terminal and negative terminal. Control circuit 50 controls the CID 110. In the illustrated embodiment of FIG. 2, the CID 110 is a switch, e.g., a transistor. In other embodiments, the CID 110 can be, e.g., a circuit breaker, relay, or fuse.

Cells 20, as shown in FIG. 2, are linked to the BECM 70 through a common data line 60. Parametric information for each cell is communicated via a digital signal (rather than low-level analog signals), thereby enhancing robustness against electromagnetic interference (EMI). Each control circuit 50 is connected to data line 60. All other cell control circuits in the pack 10 can be connected to data line 60. Data line 60 is a serial data communication line configured to send data digital between the integrated control circuits 50 and the BECM 70.

Referring now to FIG. 2, there is shown therein the battery cell 20 of FIG. 1 with integrated control circuit 50 isolated from the battery pack 10. The cell 20, of FIG. 2, includes the cell balancing circuit 100 that assists in controlling the cell's state of charge. The cell balancing circuit 100 is mechanically attached to the vehicle battery cell housing. The integrated control circuit 50 is configured to measure voltage across battery cell terminals. Cell balancing circuit 100 includes a resistor 120 arranged in series with a capacitor 130. Resistor 120 and capacitor 130 act as power sumps in the cell balancing circuit 100. Battery cell 20 includes the dedicated CID 110 to selectively connect battery terminals to the cell balancing circuit 100. Control circuit 50 is configured to actuate the CID 110. Resistor 120 is positioned on the positive side of the battery terminal. Capacitor 130 is interspersed between the positive and negative terminals.

Control circuit 50, as shown in FIG. 2, is configured to receive voltage measurements across battery terminals. Voltage measurements are analog readings of voltage across the battery terminals. In this configuration, the control circuit 50 is configured to detect an overcharge condition. When the battery is overcharged (e.g., at a more than 90% capacity) the control circuit 50 is configured to actuate the CID and connect the battery cell to the cell balancing circuit. Control circuit 50 is further configured to detect an undercharge condition (e.g., when the battery is charged to less than 90% of its capacity). When this condition is met, control circuit 100 deactivates the CID. In this embodiment, the cell can re-connect to a power source through command from the BECM. Power source can be other batteries in the pack or regenerative energy received (e.g., in hybrid vehicles from the engine or with vehicles having regenerative braking devices from the brake system).

Control circuit 50, as shown in FIG. 2, is also connected to a temperature sensor 140. Temperature sensor 140 is a thermistor configured to measure battery cell temperature. The temperature sensors 140 connected to each cell eliminate the need for the use of thermistors within the battery pack structure, as temperature data is determined within each cell—resulting in reduced cost and reduced system complexity. Temperature sensor 140 can be placed anywhere with respect to the cell housing, including internal and external arrangements. In some embodiments, control circuit 50 includes thermal logic configured to control cell performance according to temperature readings from sensor 140. For example, when cell temperature exceeds a predetermined threshold, e.g., 50 degrees Celsius, control circuit 50 actuates CID to disconnect the battery cell 20 from the pack. Control circuit logic is discussed hereinbelow with respect to FIG. 5. Control circuit 50 sends both temperature and voltage information to BECM 70 through serial data line 60 (as shown in FIG. 1).

Figure 3:
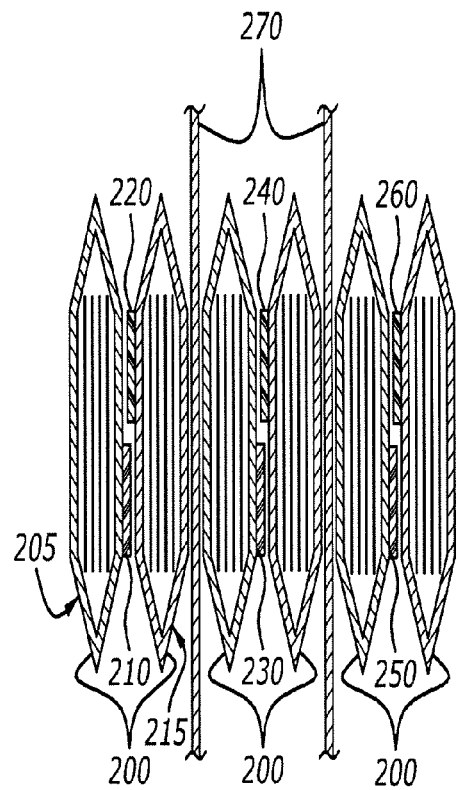
FIG. 3 is a partial cross-section view of an exemplary battery pack with cells having an integral control circuit.

With reference now to FIG. 3, there is illustrated a cross-sectional view of a set of batteries 200 in a vehicle pack. Each battery 200 has a designated control circuit 210, 220, 230, 240, 250 and 260. Separator plates 270 are included in the pack between battery cells 200. Control circuits 210, 220, 230, 240, 250 and 260 are affixed to the exterior of the cell housing. One cell 205 has control circuit 210 integrated into the cell structure. The adjacent cell 215 has control circuit 220 integrated into the cell structure. Control circuits 210 and 220 are positioned cattycorner on facing surfaces of the cells 200. In this way, cell packaging is maintained. Control circuits 210, 220, 230, 240, 250 and 260 are electrically connected to the cell terminals (e.g., as shown and discussed with respect to FIGS. 1 and 2).

Figure 4:
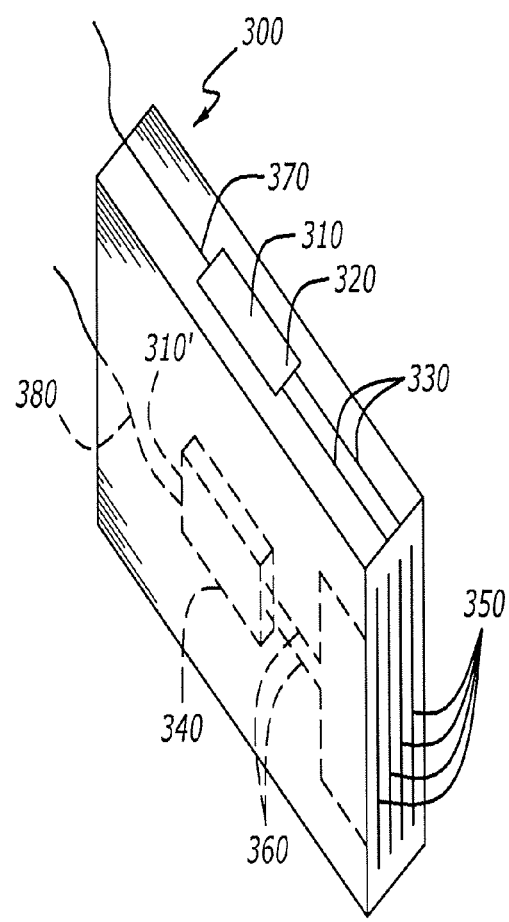
FIG. 4 is another exemplary vehicle battery cell with integral control circuit.

FIG. 4 illustrates a single battery cell 300 compatible with a vehicle battery pack, e.g., 10 as shown in FIG. 1. The cell 300 incorporates an integral control circuit within the cell. Two exemplary positions for the control circuit are shown in FIG. 4 as 310 and 310'. At position 310, the control circuit is integral with the cell 300 in that the circuit is mechanically attached to the top exterior housing of the battery cell. The circuit includes a processor circuit board 320 soldered onto the cell housing. Lead lines 330 are run from the processor to the battery terminals. At position 310', the control circuit is integral with the cell in that the circuit is attached to the housing of the battery cell. In this embodiment, control circuit includes a processor circuit board 340 that is attached to the middle interior of cell housing. The circuit includes a sheet of insulated material (not shown) between the cell anode(s) 350 and the processor circuit board 340. In this embodiment, lead lines 360 are run from the processor 340 to the battery terminals. In other embodiments, electrical wiring is also run to other cell components such as a temperature sensor or a current interruption device. The control circuit includes a data line (e.g., 370 and 380) configured to communicate with the BECM. Processor circuit boards 320, 340 are insulated from the battery terminals through housing.

Figure 5:
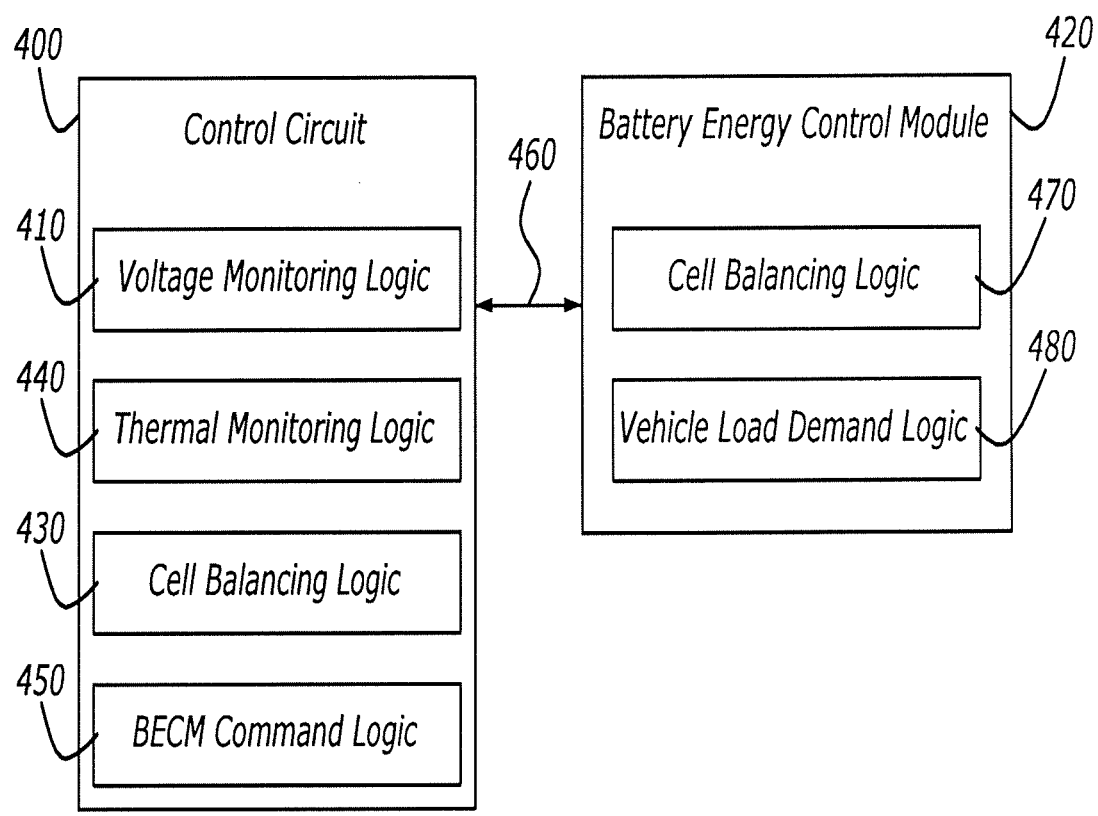
FIG. 5 is an exemplary integral control circuit with control logic for a battery cell.

Referring now to FIG. 5, there is shown an exemplary integral control circuit 400 with control logic for a battery cell. Control circuit 400 is a battery management control circuit that can be included with the cell housing. Control circuit 400 includes a processor programmed with different logics to control cell function. In other embodiments, control circuit 400 is an applied-specific integrated circuitry (or ASIC) and a processor is not required.

Control circuit 400, as shown in FIG. 5, is configured to detect an overcharge condition and selectively connect the battery cell to a power sump when a state of charge condition is met. Control circuit 400 includes voltage monitoring logic 410. Logic 410 is configured to receive voltage readings across battery terminals. Logic 410 accepts analog measurements of voltage and a signal converter to convert analog measurements into digital signals. Voltage measuring logic 410 is programmed to send voltage readings to a central control unit, in this case the BECM 420.

As shown in FIG. 5, control circuit 400 also includes cell balancing logic 430 configured to control battery cell connection to a power sump. Cell balancing logic 430 receives voltage readings from voltage monitoring logic 410. Cell balancing logic 430 is programmed to compare voltage readings with a predetermined upper and lower state-of-charge threshold. Cell balancing logic 430 is programmed to compare voltage readings with a predetermined upper state-of-charge threshold. Where a voltage above the state-of-charge upper threshold is detected cell balancing logic 430 send a command signal to a switch (or CID) to connect the cell to a power sump (e.g., the cell balancing circuit as discussed with respect to FIG. 2). Where a voltage below the state-of-charge lower threshold is detected, BECM 420 sends a command signal to a switch (or CID) to connect the cell to a power source. The power source can be, for example, load received from other vehicle components or batteries.

The control circuit 400, as shown in FIG. 5, further includes a thermal circuit 440 configured to measure cell temperature. The thermal circuit 440 includes thermal monitoring logic and a temperature sensor (e.g., 140 as shown in FIG. 3). Thermal monitoring logic 440, as shown in FIG. 5, is configured to control a state of charge for the battery cell according to data received from the thermal circuit. Thermal monitoring logic 440 is configured to accept temperature readings from the temperature sensor. Temperature readings are indicative of cell temperature. Temperature readings can be sent via analog or digital signal to thermal monitoring logic 440. Cell balancing logic 430 is configured to control battery state of charge based on battery temperature. When battery temperature exceeds a predetermined threshold, control circuit actuates a CID to disconnect the battery from other battery cells. This command comes from control circuit 400 and not the BECM 420.

The control circuit 400 is configured to communicate with the BECM 420, as shown in FIG. 5. Control circuit 400 includes BECM command logic 450 configured to receive command signals from the BECM 420 through data line 460. In this embodiment, BECM 420 is also configured with cell balancing logic 470. Control circuit 400 sends voltage readings to BECM 420 through the serial data line 460. BECM 420 can also instruct control circuit 400 to actuate a CID based on voltage readings, temperature or vehicle load demands. BECM 420 includes vehicle load demand logic 480. Logic 480 is in communication with the PCM configured to receive vehicle load demands. BECM 420 is further configured to selectively connect cells based on vehicle load demands. For example, in one embodiment where a lower load is demanded, only 50% of the battery cells are connected to the power line. In other embodiments, control circuit 400 and BECM 420 can include less or more program logics.

Disclosed herein is also a method of managing the state of charge in a plurality of battery cells. Managing the state of charge includes mitigating both battery overcharge and undercharge. The method includes the steps of communicating with an integral battery cell control circuit (e.g., as discussed with respect to FIGS. 1-2); and sending performance commands for the battery cell based on data received from the integral battery cell control circuit. An exemplary performance command may be to disconnect the battery from a power line or connect the battery to a cell balancing circuit. In one embodiment, the method includes a step of deriving performance commands for another battery cell based on data received from the integral battery cell control circuit. For example, where a lower voltage reading is measured with respect to one battery cell, a BECM is configured to instruct a second cell to connect to the first battery cell for charging. BECM sends a command signal to a dedicated control circuit specific to the battery cell.

The present disclosure further relates to a method of manufacturing a vehicle battery pack. An exemplary pack is shown in FIGS. 1 and 2. The method can include providing a plurality of battery cells (e.g., 20 as shown in FIG. 1); and connecting a current interruption device between at least two battery cells. An exemplary CID is shown and discussed with respect to FIGS. 1 and 2. The CID can be, for example, a circuit breaker, relay, fuse, transistor or switch. The method also includes connecting each cell to a designated integral control circuit configured to control the current interruption device according to predetermined conditions. Some of the predetermined conditions can be, for example, thermal conditions, upper and lower voltage thresholds exceeded or vehicle load demands. The method can include the step of connecting each integral control circuit to a central controller through a serial or signal data line. The data line is a serial data line for digital communications.

In one embodiment, the method includes: programming one of the integrated control circuits with cell balancing logic configured to connect or disconnect the battery cell when a predetermined condition is met. Exemplary cell balancing logic is discussed with respect to FIG. 5. In another embodiment, the method includes: connecting a temperature sensor to at least one integral control circuit; and programming the integrated control circuit with thermal monitoring logic configured to activate the current interruption device when a cell temperature exceeds a predetermined thermal threshold. Exemplary thermal monitoring logic is discussed with respect to FIG. 5. In another embodiment, the method also includes the step of programming one of the integral control circuits to communicate with a battery energy control module through the serial data line. The integral control circuit is configured to communicate cell temperature or voltage readings to the battery energy control module.

It will be apparent to those skilled in the art that various modifications and variations can be made to the methodologies of the present invention without departing from the scope of its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A vehicle battery pack, comprising:
   a battery cell including having a current interruption device and an integral control circuit configured to communicate with a battery energy control module, wherein the current interruption device is configured to selectively disconnect the battery cell from a power line and to connect the battery cell to a cell balancing circuit to drain the battery cell when a first predetermined condition is met.

2. The vehicle battery pack of claim 1, wherein the integral control circuit is configured to send serial data to the battery energy control module.

3. The vehicle battery pack of claim 1, wherein the first predetermined condition is receipt of a disconnect command signal from the battery energy control module.

4. The vehicle battery pack of claim 1, wherein the current interruption device is a circuit breaker, relay, fuse, transistor or switch.

5. The vehicle battery pack of claim 1, wherein the battery cell includes the cell balancing circuit with a power sump;
   wherein the integral control circuit is configured to connect the cell balancing circuit to the battery cell terminals when a second predetermined condition is met.

6. The vehicle battery pack of claim 5, wherein the power sump is a resistor or capacitor.

7. The vehicle battery pack of claim 1, wherein the battery cell further comprises a temperature sensor configured to send the integral control circuit data related to a battery cell temperature; and wherein the predetermined condition is the battery cell temperature exceeding a thermal threshold.

8. The vehicle battery pack of claim 1, wherein the power line is configured to supply power from the battery cell to vehicle load.

9. A control circuit attachable to a battery cell for a vehicle battery pack configured to detect a predetermined condition and selectively connect the battery cell to a power sump or a power load when the predetermined condition is met, wherein the control circuit is in communication with a thermal circuit configured to measure cell temperature, wherein the control circuit is configured to disconnect the battery cell from other cells according to data received from the thermal circuit.

10. The control circuit of claim 9, wherein the control circuit includes a processor having cell balancing logic configured to control cell connection to a power sump.

11. The control circuit of claim 9, wherein the control circuit is in communication with a thermal circuit configured to measure cell temperature.

12. A method of managing the state of charge in a plurality of battery cells, comprising:
   communicating with an integral battery cell control circuit; and
   sending performance commands to the battery cell based on data received from the integral battery cell control circuit, wherein the performance commands include actuation of a current interruption device to connect the cell to a power sump within the integral battery cell control circuit, wherein actuation of the current interruption device disconnects the battery cell from a supply line configured to communicate power from the battery cell.

13. The method of claim 12, further comprising:
   sending performance commands for another battery cell based on data received from the integral battery cell control circuit.

14. A method of manufacturing a vehicle battery pack, comprising:
   connecting a current interruption device between at least two battery cells; and
   connecting each cell to a designated integral control circuit configured to control the current interruption device according to predetermined conditions, the current interruption device actuating to selectively disconnect at least one of the cells from a power line that supplies power to a vehicle load.

15. The method of claim 14, further comprising:
   connecting an integral control circuit to a central controller through a serial data line.

16. The method of claim 14, further comprising:
   programming one of the integrated control circuits with cell balancing logic configured to connect or disconnect the battery cell when one of the predetermined conditions is met.

17. The method of claim 14, further comprising:
   connecting a temperature sensor to at least one integral control circuit; and
   programming the integral control circuit with thermal monitoring logic configured to activate the current interruption device when a cell temperature exceeds a predetermined thermal threshold.

18. The method of claim 17, further comprising;
   programming one of the integral control circuits to communicate with a battery energy control module through the serial data line;
   wherein the integral control circuit is configured to communicate cell temperature or voltage readings to the battery energy control module.

19. A vehicle battery cell, comprising:
an integral control circuit configured to communicate with a control module for managing energy of a plurality of battery cells, wherein the integral control circuit is configured to detect a predetermined condition and disconnect at least one of the battery cells from a power line when the predetermined condition is met, the power line to communicate power from the plurality of battery cells.

20. The battery cell of claim 19, further comprising:
a temperature sensor configured to measure battery cell temperature;
wherein the control circuit includes thermal monitoring logic configured to activate a current interruption device when a cell temperature exceeds a predetermined thermal threshold.

21. The battery cell of claim 20, wherein the current interruption device is actuatable between a first position that connects the at least one of the cells to the power line and a second position that disconnects the at least one of the cells from the power line and connects the at least one of the cells to a power sump within a cell balancing circuit of the cells.

\* \* \* \* \*